US012763589B2

(12) United States Patent
Barron et al.

(10) Patent No.: US 12,763,589 B2
(45) Date of Patent: Oct. 13, 2026

(54) CONTROL SYSTEM FOR MANAGING BATTERY CELLS WITH ONE OR MORE DC-TO-DC CONVERTERS

(71) Applicant: Deere & Company, Moline, IL (US)

(72) Inventors: Abraham Alberto Martinez Barron, Monterrey (MX); Ricardo Schacht Rodriguez, Guadalupe (MX); Gerardo Escobar Valderrama, Monterrey (MX)

(73) Assignee: Deere & Company, Moline, IL (US)

( * ) Notice: Subject to any disclaimer, the term of this patent is extended or adjusted under 35 U.S.C. 154(b) by 1078 days.

(21) Appl. No.: 17/644,644

(22) Filed: Dec. 16, 2021

(65) Prior Publication Data

US 2022/0385076 A1 Dec. 1, 2022

Related U.S. Application Data

(60) Provisional application No. 63/202,139, filed on May 28, 2021.

(51) Int. Cl.

*H02J 1/10* (2026.01)
*H02J 7/00* (2026.01)
*H02J 7/50* (2026.01)
*H02M 3/158* (2006.01)

(52) U.S. Cl.

CPC ................ *H02J 7/50* (2026.01); *H02J 1/106* (2020.01); *H02J 7/855* (2026.01); *H02M 3/158* (2013.01)

(58) Field of Classification Search

CPC ........ H02J 7/0013; H02J 1/106; H02J 7/0063; H02M 3/158

See application file for complete search history.

(56) References Cited

U.S. PATENT DOCUMENTS

| | | | |
|---|---|---|---|
| 7,193,392 | B2 | 3/2007 | King et al. |
| 7,245,108 | B2 | 7/2007 | Chertok et al. |
| 7,378,818 | B2 | 5/2008 | Fowler et al. |
| 7,573,235 | B2 | 8/2009 | Hand |
| 7,663,341 | B2 | 2/2010 | Lee et al. |

(Continued)

OTHER PUBLICATIONS

Lai et al. "Co-estimation of state of charge and state of power for lithium-ion batteries based on fractional variable-order model" Journal of Cleaner Production vol. 255, May 10, 2020. (Year: 2020).*

(Continued)

*Primary Examiner* — Drew A Dunn
*Assistant Examiner* — Pamela J Jeppson
(74) *Attorney, Agent, or Firm* — Harness, Dickey & Pierce, P.L.C.

(57) ABSTRACT

A first direct-current to direct-current (DC-to-DC) converter is configured to convert an input direct-current voltage to an output direct-current voltage with a regulated charging current consistent with a target charging current limit or range established by the current estimator for the charging mode and respective cell identifier(s) determined by a cell balancing module for the charging mode for the time interval. A first controller is capable of controlling the charging, individually or collectively, of each of the battery cells by adjusting/controlling the regulated charging current outputted by the first DC-DC converter and/or the duty cycle of switches of the first DC-to-DC converter based on the target charging current limit or range for the time interval.

12 Claims, 1 Drawing Sheet

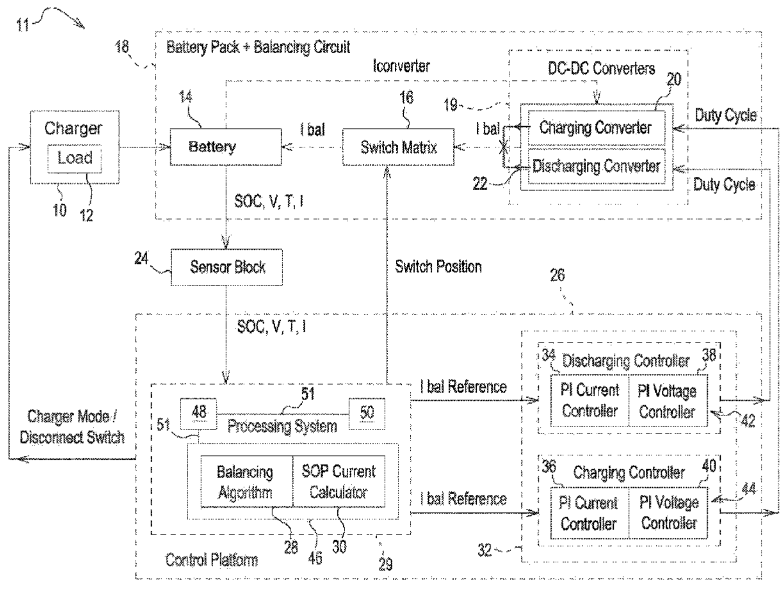

(56) References Cited

U.S. PATENT DOCUMENTS

| | | | | |
|---|---|---|---|---|
| 7,889,524 | B2 | 2/2011 | Lee et al. | |
| 8,030,798 | B2 | 10/2011 | Seligman | |
| 8,084,154 | B2 | 12/2011 | Scheucher | |
| 8,115,453 | B2 | 2/2012 | Houldsworth et al. | |
| 8,358,136 | B2 | 1/2013 | Fredette | |
| 8,427,107 | B2 | 4/2013 | Firehammer | |
| 8,466,657 | B2 | 6/2013 | Buono et al. | |
| 8,541,979 | B2 | 9/2013 | Firehammer et al. | |
| 8,614,563 | B2 | 12/2013 | Baughman | |
| 8,658,299 | B2 | 2/2014 | Yang et al. | |
| 8,815,424 | B2 | 8/2014 | Scheucher | |
| 8,901,888 | B1 | 12/2014 | Beckman | |
| 8,933,666 | B2 | 1/2015 | Schwartz et al. | |
| 9,385,553 | B2 | 7/2016 | Aiura | |
| 9,444,267 | B2 | 9/2016 | Suzuki et al. | |
| 9,450,426 | B2 | 9/2016 | Moorhead et al. | |
| 9,601,940 | B2 | 3/2017 | Camp et al. | |
| 9,673,658 | B2 | 6/2017 | Jeong et al. | |
| 9,694,697 | B2 | 7/2017 | Brabec | |
| 9,711,868 | B2 | 7/2017 | Scheucher | |
| 9,748,786 | B2 | 8/2017 | Camp et al. | |
| 9,912,178 | B2 | 3/2018 | Nysen | |
| 9,923,399 | B2 | 3/2018 | Camp et al. | |
| 10,033,212 | B2 | 7/2018 | Camp et al. | |
| 10,056,764 | B2 | 8/2018 | Nysen | |
| 10,084,324 | B2 | 9/2018 | Moorhead et al. | |
| 10,173,539 | B2 | 1/2019 | Komma et al. | |
| 10,396,582 | B2 | 8/2019 | Yi et al. | |
| 10,476,283 | B2 | 11/2019 | Leung et al. | |
| 10,680,447 | B2 | 6/2020 | Yang et al. | |
| 10,756,548 | B2 | 8/2020 | Syouda | |
| 10,833,522 | B2 | 11/2020 | Camp et al. | |
| 10,903,661 | B2 | 1/2021 | Nysen | |
| 10,903,753 | B2 | 1/2021 | Frattini et al. | |
| 10,910,847 | B2 | 2/2021 | Grasshoff | |
| 11,027,614 | B2 | 6/2021 | Nakao | |
| 11,177,669 | B2 | 11/2021 | Sung | |
| 11,251,628 | B2 | 2/2022 | Peretz et al. | |
| 2004/0135546 | A1 | 7/2004 | Chertok et al. | |
| 2009/0195219 | A1* | 8/2009 | Morita | B60L 3/0046 320/162 |
| 2012/0041635 | A1* | 2/2012 | Johnson | G06F 11/2294 701/31.4 |
| 2014/0203654 | A1* | 7/2014 | Takahashi | H01M 10/4207 307/43 |
| 2015/0214757 | A1* | 7/2015 | Zane | H02J 7/0016 320/107 |
| 2016/0016482 | A1* | 1/2016 | Lee | B60K 6/40 701/22 |
| 2016/0336765 | A1* | 11/2016 | Trimboli | H02J 7/0068 |
| 2020/0303929 | A1* | 9/2020 | Watanabe | H02J 7/02 |

OTHER PUBLICATIONS

Rehman et al., Modular Approach for Continuous Cell-Level Balancing to Improve Performance of Large Battery Packs, NREL Conference Paper, Oct. 2014, pp. 1-8.

Pham et al., A Low Cost and Fast Cell-to-Cell Balancing Circuit for Lithium-Ion Battery Strings, Electronics (MDPI Journal of), Feb. 3, 2020, pp. 1-13, doi:10.3390/electronics9020248.

Ferraz et al., A Comparative Study on the Influence of DC/DC Converter Induced High Frequency Current Ripple on Lithium-Ion Batteries, Sustainability (MDPI Journal of), Oct. 31, 2019, pp. 1-17, doi:10.3390/su11216050.

Mexican Office Action dated Jul. 9, 2025 for corresponding Mexican Patent Application No. MX/a/2022/006331.

Texas Instruments, "Design a second-stage filter for sensitive applications," Texas Instruments, Jan. 18, 2018. [Online]. Available: https://e2e.ti.com/blogs_/b/powerhouse/posts/design-a-second-stage-filter-for-sensitive-applications. [Accessed Mar. 27, 2021].

G. L. Plett, Battery Management Systems, vol. II: Equivalent-Circuit Methods, 1Sst ed., Artech House, 2015.

G. Pistoia, "Lithium-Ion Batteries—Advances and Applications," in Lithium-Ion Batteries—Advances and Applications, 1st ed., Elsevier, 2014.

F. Altaf, B. Egardt and L. Johannesson Mårdh, "Load Management of Modular Battery Using Model Predictive Control: Thermal and State-of-Charge Balancing," IEEE Transactions on Control Systems Technology, vol. 25, No. 1, pp. 47-62, 2017.

F. Ran, H. Xu, J. Qin and W. Li, "An active balancing circuit for lithium battery management system with optoelectronic switches," in TENCON 2015—2015 IEEE Region 10 Conference, 2015.

D. Park, S. Choi, R. Kim and D. Kim, "A novel battery cell balancing circuit using an auxiliary circuit for fast equalization," in IECON 2014—40th Annual Conference of the IEEE Industrial Electronics Society, 2014.

V. Pham, T. Nguyen, D. Tran, V. Vu and C. Woojin, "A new cell-to-cell fast balancing circuit for Lithium-Ion batteries in Electric Vehicles and Energy Storage System," in 2016 IEEE 8th International Power Electronics and Motion Control Conference (IPEMC-ECCE Asia), 2016.

F. S. Hoekstra, H. J. Bergveld and M. C. Donkers, "Range Maximisation of Electric Vehicles through Active Cell Balancing using Reachability Analysis," in 2019 American Control Conference (ACC), 2019.

L. A. Perişoară, I. C. Guran and D. C. Costache, "A Passive Battery Management System for Fast Balancing of Four LiFePO4 Cells," in IEEE 24th International Symposium for Design and Technology in Electronic Packaging (SIITME), 2008.

Amin, K. Ismail, A. Nugroho and S. Kaleg, "Passive balancing battery management system using MOSFET internal resistance as balancing resistor," in 2017 International Conference on Sustainable Energy Engineering and Application (ICSEEA), 2017.

K. Vitols, "Efficiency of LiFePO4 battery and charger with passive balancing," in 2015 IEEE 3rd Workshop on Advances in Information, Electronic and Electrical Engineering (AIEEE), 2015.

D. G. Elvira, H. Valderrama Blavi, J. M. Bosque Moncusí, A. Cid Pastor, J. A. Garriga Castillo and L. Martínez Salamero, "Active Battery Balancing Via a Switched DC/DC Converter: Description and Performance Analysis," in 16th Conference on Electrical Machines, Drives and Power Systems (ELMA), 2019.

Y. J. Park, M. K. Kim, H. S. Kim and B. M. Lee, "Risk assessment of lithium-ion battery explosion: chemical leakages," Journal of Toxicology and Environmental Health, vol. 21, No. 6, pp. 370-381, 2018.

J. Qi and D. Dah-Chuan Lu, "Review of battery cell balancing techniques," in Australasian Universities Power Engineering Conference (AUPEC), 2014.

M. Räber, D. Hink, A. Heinzelman and D. O. Abdeslam, "A Novel Non-Isolated Active Charge Balancing Architecture for Lithium-Ion Batteries," in IEEE 27th International Symposium on Industrial Electronics (ISIE), 2018.

L. Zheng, J. Zhu and G. Wang, "A comparative study of battery balancing strategies for different battery operation processes," in 2016 IEEE Transportation Electrification Conference and Expo (ITEC), 2016.

X. Wei and B. Zhu, "The research of vehicle power Li-ion battery pack balancing method," in 2009 9th International Conference on Electronic Measurement Instruments, 2009.

A. Ziegler, D. Oeser, B. Arndt and A. Ackva, "Comparison of Active and Passive Balancing by a Long Term Test Including a Post-Mortem Analysis of all Single Battery Cells," in 2018 International IEEE Conference and Workshop in Óbuda on Electrical and Power Engineering (CANDO-EPE), 2018.

J. Ouyang, P. Zhang, S. Wang and H. Li, "Active balancing charging module with continuous and controllable isolation for battery management system," in 2017 IEEE Electrical Design of Advanced Packaging and Systems Symposium (EDAPS), 2017.

A. S. Raj, K. P. Guruswamy, C. Vijay, A. M. Siddeshwar and C. M. Maheshan, "Modelling of flyback converter using state space averaging technique," in 2015 IEEE International Conference on Electronics, Computing and Communication Technologies (CONECCT), 2015.

(56) References Cited

OTHER PUBLICATIONS

V. Pham, V. Duong and W. Choi, "A Low Cost and Fast Cell-to-Cell Balancing Circuit for Lithium-Ion Battery Strings," Journal of Electronics, vol. 9, p. 248, 2020.

S. Steinhorst and M. Lukasiewycz, "Formal approaches to design of active cell balancing architectures in Battery Management Systems," in 2016 IEEE/ACM International Conference on Computer-Aided Design (ICCAD), 2016.

C. Piao, Z. Wang, J. Cao, W. Zhang and S. Lu, "Lithium-Ion Battery Cell-Balancing Algorithm for Battery Management System Based on Real-Time Outlier Detection," Mathematical Problems in Engineering, vol. 2015, pp. 1-12, 2015.

M. Chen and G. Rincón-Mora, "Accurate Electrical Battery Model Capable of Predicting Runtime and I-V Performance," IEEE Transactions on Energy Conversion, vol. 21, pp. 504-511, 2006.

X. Lin, H. Perez and S. Mohan, "A lumped-parameter electro-thermal model for cylindrical batteries," Journal of Power Sources, vol. 257, pp. 1-11, 2014.

Z. He, M. Gao, J. Xu and Y. Liu, "Battery Model Parameters Estimation with the Sigma Point Kalman Filter," in 2009 International Conference on Artificial Intelligence and Computational Intelligence, 2009.

M. Gao, Y. Liu and Z. He, "Battery state of charge online estimation based on particle filter," in 2011 4th International Congress on Image and Signal Processing, 2011.

B. Schweighofer, K. Raab and G. Brasseur, "Modeling of high power automotive batteries by the use of an automated test system," IEEE Transactions on Instrumentation and Measurement, vol. 52, pp. 1087-1091, 2003.

L. Gao, S. Liu and R. Dougal, "Dynamic lithium-ion Battery model for system simulation," IEEE Transactions on Components and Packaging Technologies, vol. 25, pp. 495-505, 2002.

M. Glass, "Battery electrochemical nonlinear/dynamic SPICE model," in IECEC 96. Proceedings of the 31st Intersociety Energy Conversion Engineering Conference, Washington, 1996.

S. Buller, M. Thele, R. De Doncker and E. Karden, "Impedance-based simulation models of supercapacitors and Li-ion batteries for power electronic applications," IEEE Transactions on Industry Applications, vol. 41, No. 3, pp. 742-747, 2005.

P. Baudry, M. Neri, M. Gueguen and G. Lonchampt, "Electro-thermal modelling of polymer lithium batteries for starting period and pulse power," Journal of Power Sources, vol. 54, No. 2, pp. 393-396, 1995.

L. Benini, G. Castelli, A. Macii, E. Macii, M. Poncino and R. Scarsi, "Discrete-time battery models for system-level low-power design," IEEE Transactions on Very Large Scale Integration (VLSI) Systems, vol. 9, No. 5, pp. 630-640, 2001.

S. C. Hageman, "Simple PSpice models let you simulate common battery types," Electronic Design News, vol. 38, pp. 117-129, 1993.

S. Gold, "A PSPICE macromodel for lithium-ion batteries," in The Twelfth Annual Battery Conference on Applications and Advances, Long Beach, USA, 1997.

C. Bonfiglio and W. Roessler, "A cost optimized battery management system with active cell balancing for lithium ion battery stacks," in 2009 IEEE Vehicle Power and Propulsion Conference, 2009.

W. Huang and J. A. Abu Qahoug, "Energy Sharing Control Scheme for State-of-Charge Balancing of Distributed Battery Energy Storage System," IEEE Transactions on Industrial Electronics, vol. 62, No. 5, pp. 2764-2776, 2015.

C. Zun, S. Park and H. Mok, "New Cell Balancing Charging System Research for Lithium-ion Batteries," Energies, vol. 13, No. 6, p. 1393, 2020.

S. Wu, H. Chen and C. Chien, "A Novel Active Cell Balancing Circuit and Charging Strategy in Lithium Battery Pack," Energies, vol. 12, No. 23, p. 4473, 2019.

T. Yang, M. Yu and F. Fang, "State-of-charge balancing control for battery energy storage system based on event-triggered scheme," Applied Physics A: Materials Science & Processing, vol. 125, No. 5, 2019.

C. H. Lin, H. Y. Chao, C. M. Wang and M. H. Hung, "Battery management system with dual-balancing mechanism for LiFePO4 battery module," in TENCON 2011—2011 IEEE Region 10 Conference, 2011.

J. Han, S. Yang, X. Liu and W. Yang, "An Active Direct Cell-to-Cell Balancing Circuit in Continuous Current Mode for Series Connected Batteries," Energies, vol. 12, No. 20, p. 3978, 2019.

R. K. Vardhan, T. Selvathai, R. Reginald and p. Sivakumar, "Modelling of Multi Inductor-based Balancing of Battery Pack for Electrical Mobility," Defence Science Journal, vol. 69, No. 3, p. 266, 2019.

A. Farzan Moghaddam and A. Van de Bossche, "A Ćuk Converter Cell Balancing Technique by Using Coupled Inductors for Lithium-Based Batteries," Energies, vol. 12, No. 15, p. 2881, 2019.

S. Narayanaswamy, S. Park, S. Steinhorst and S. Chakraborty, "Multi-Pattern Active Cell Balancing Architecture and Equalization Strategy for Battery Packs," in 2018 ACM/IEEE International Symposium on Low Power Electronics and Design, 2018.

L.-R. Chen, "Design of Duty-Varied Voltage Pulse Charger for Improving Li-Ion Battery-Charging Response," IEEE Transactions on Industrial Electronics, vol. 56, pp. 480-487, 2009.

B. Bole, C. Kulkarni and M. Daigle, "Adaptation of an Electrochemistry-based Li-ion Battery Model to Account for Deterioration Observed Under Randomized Use," PHM 2014—Proceedings of the Annual Conference of the Prognostics and Health Management Society 2014, 2014.

M. Murshadul, M. A. Hannan and A. Mohamed, "Charging and discharging model of lithium-ion battery for charge equalization control using particle swarm optimization algorithm," Journal of Renewable and Sustainable Energy, vol. 8, No. 6, 2016.

S. Skogestad, "Probably the best simple PID tuning rules in the world," Journal of Process Control, 2001.

K. Hashimoto, T. Okuda and T. Hikihara, "A Flyback Converter with SiC Power MOSFET Operating at 10 MHZ: Reducing Leakage Inductance for Improvement of Switching Behaviors," in 2018 International Power Electronics Conference (IPEC-Niigata 2018-ECCE Asia), Niigata, 2018.

D. W. Hart, Power Electronics, Valparaiso, Indiana: McGraw-Hill, 2011.

E. P. Agency, "EPA Nonregulatory Nonroad Duty Cycles," [Online]. Available: https://www.epa.gov/moves/epa-nonregulatory-nonroad-duty-cycles. [Accessed Aug. 8, 2020].

* cited by examiner

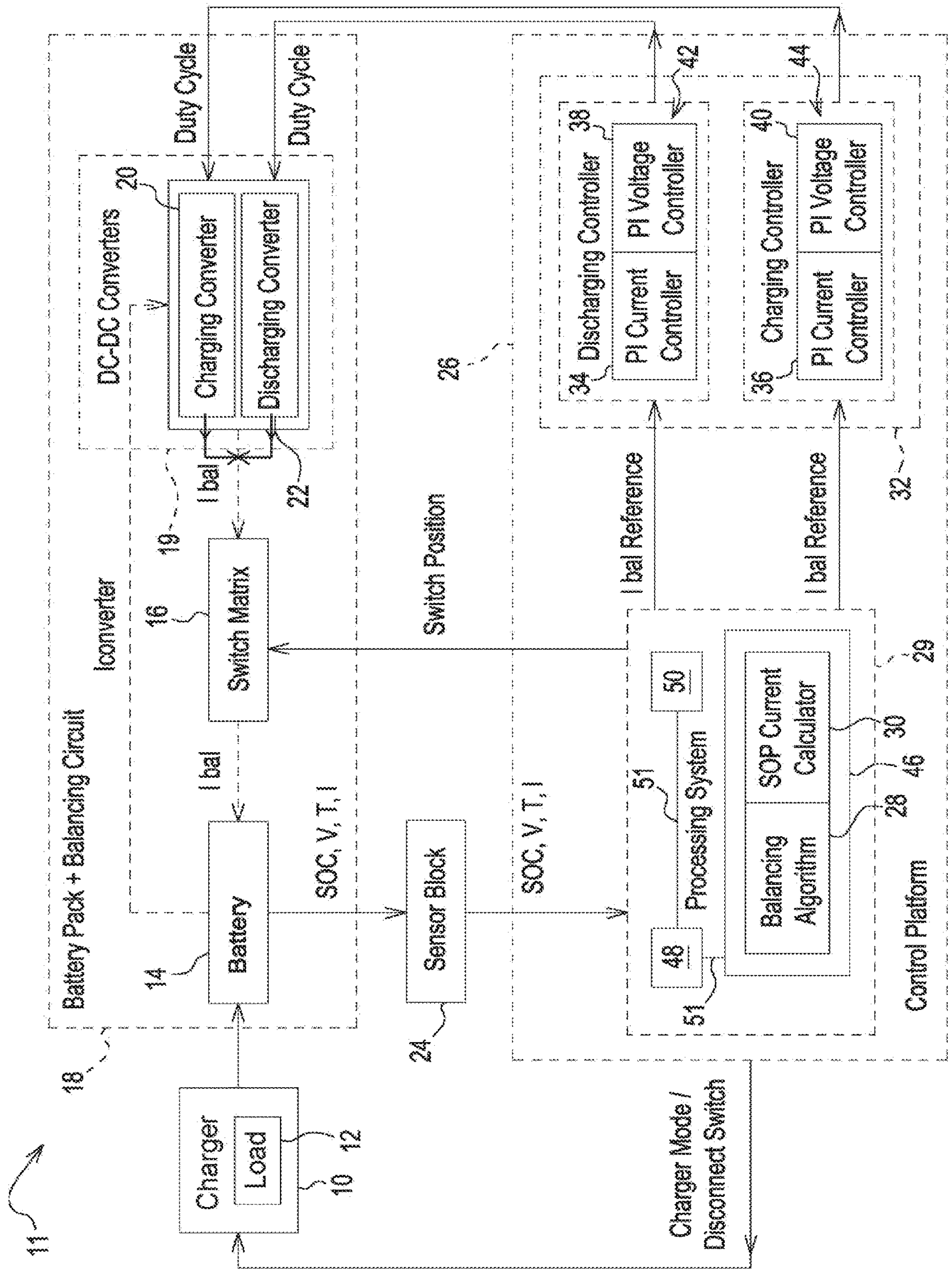

11
Charger
Load
10
12
18
Battery Pack + Balancing Circuit
Battery
14
Iconverter
I bal
Switch Matrix
16
19
I bal
DC-DC Converters
Charging Converter
Discharging Converter
20
22
Duty Cycle
Duty Cycle
SOC, V, T, I
Sensor Block
24
SOC, V, T, I
Switch Position
26
Processing System
48
50
51
51
Balancing Algorithm
SOP Current Calculator
28
30
46
29
Control Platform
I bal Reference
I bal Reference
Discharging Controller
PI Current Controller
PI Voltage Controller
34
38
42
Charging Controller
PI Current Controller
PI Voltage Controller
36
40
44
32
Charger Mode / Disconnect Switch

CONTROL SYSTEM FOR MANAGING BATTERY CELLS WITH ONE OR MORE DC-TO-DC CONVERTERS

RELATED APPLICATION

This document (including the drawings) claims priority and the benefit of the filing date based on U.S. provisional application No. 63/202,139, filed May 28, 2021, and entitled CONTROL SYSTEM FOR MANAGING BATTERY CELLS WITH ONE OR MORE DC-TO-DC CONVERTERS under 35 U.S.C. § 119 (e), where the provisional application is hereby incorporated by reference herein.

FIELD

This disclosure relates to a control system for managing battery cells with one or more direct-current (DC)-to-direct current (DC) converters.

BACKGROUND

In some prior art, battery cells, such as lithium-ion battery cells, tend to have slight differences because of manufacturing tolerances and processes that affect the cells' performance during charging, discharging, and operation. To compensate for differences in the battery cells, a battery balancing system can attempt to achieve a homogenous or uniform State of Charge (SoC) for each battery cell. If the battery balancing system does not properly control a DC-to-DC converter to regulate the charging current or discharging current, the battery cells; hence, the entire battery may perform with less than optimal efficiency, such as wasting energy in a discharge mode, wasting battery capacity in a charging mode, or not providing full rated capacity during the operational mode of the battery. Therefore, there is a need for a control system for managing battery cells with one or more direct-current to direct-current converters.

SUMMARY

In accordance with one embodiment and one aspect of the disclosure, a control system for managing battery cells comprises a battery, which has an array of battery cells. The battery has battery terminals and the battery cells have cellular terminals. An electronic data is processor is configured to execute software instructions of a cell balancing module and current estimator, where the cell balancing module and current estimator are stored in a data storage device in communication with the electronic data processor. A first direct-current to direct-current (DC-to-DC) converter is configured to convert an input direct-current voltage to an output direct-current voltage with a regulated charging current consistent with a target charging current limit or range established by the current estimator for the charging mode and respective cell identifier(s) determined by a cell balancing module for the charging mode for the time interval. A first controller is capable of controlling the charging, individually or collectively, of each of the battery cells by adjusting/controlling the regulated charging current outputted by the first DC-DC converter and/or the duty cycle of switches of the first DC-to-DC converter based on the target charging current limit or range for the time interval.

In accordance with another aspect of the disclosure, a second direct-current to direct-current (DC-to-DC) converter is configured to convert an input direct-current voltage to an output direct-current voltage with a regulated discharging current consistent with a target discharging current limit or range established by the current estimator for the discharging mode and respective cell identifier(s) determined by a cell balancing module for the discharging mode for the time interval. A second controller is capable of controlling the discharging, individually or collectively, of each of the battery cells by adjusting/controlling the regulated discharging current outputted by the second DC-DC converter and/or the duty cycle of switches of second DC-to-DC converter based on the target discharging current limit or range for the time interval.

In accordance with yet another aspect of the disclosure, a switch matrix interface comprises a set of switches that is configured to enable or disable, selectively (for any time interval) by the electronic data processor: (a) a first electrical connection/coupling between DC output terminals of the first DC-to-DC converter and one or more corresponding cellular terminals of battery cell(s), and (b) a second electrical connection/coupling between DC output terminals of the second DC-to-DC converter and one or more corresponding cellular terminals of the battery cell(s), where each battery cell can operate in a mutually exclusive charging mode or discharging mode during any time interval. Sensors are associated with the battery, or a respective sensor is associated with each cell of the battery. Each sensor may comprise a voltage sensor and a current sensor to provide sensed voltages and sensed currents for corresponding battery cells for any time interval, to the electronic data processor and the balancing module, the current estimator, or both. The balancing module or the current estimator, or both, are configured to determine whether each battery cell operates in the charging mode or discharging mode for any time interval based on the sensed voltages and sensed currents for corresponding battery cells of the battery (e.g., in accordance with State-of-Power evaluation of equations as described in this disclosure later in greater detail). The balancing module is configured to provide control signals to enable or disable the switching states of the switches within the switching matrix to establish the first electrical connection or the second electrical connection for each battery cell (e.g., to facilitate efficiency management of the battery and balancing of the battery cells).

BRIEF DESCRIPTION OF THE DRAWINGS

FIG. 1 is a block diagram of one embodiment of a control system for managing battery cells with one or more direct-current (DC)-to-direct current (DC) converters.

DETAILED DESCRIPTION

In FIG. 1 in accordance with on embodiment, a control platform 26 is coupled to a battery pack and balancing circuit 18. Further, one or more sensors 24 are coupled between the control platform 26 and the battery pack and balancing circuit 18. An optional load 12, charger 10, or both can be connected to the battery terminals of the battery pack and balancing circuit 18 or entire battery 14, as opposed to individual battery cells of the battery 14. The optional load 12 or charger 10 may be associated with a disconnect switch that is controlled by an electronic data processor 48 of the control platform 26.

In one embodiment, the control platform 26 comprises an electronic data processing system 29. The electronic data processing system 29 further comprises an electronic data processor 48, a data storage device 46, and one or more data ports 50 that can communicate and send data messages to each other via a data bus 51 or other communication lines. The data storage device 46 is configured to store, retrieve, access, write, and read software instructions, data records and/or files. For example, the data storage device 46 may store, retrieve, access, write and read a balancing module 28, a current estimator 30, or both.

In practice, the electronic data processor 48 may comprise a microprocessor, a microcontroller, a programmable logic device (PLA), a field programmable gate array (FPGA), an application specific integrated circuit (ASIC), a digital signal processor (DSP), logic circuit, an arithmetic logic unit (ALU), digital circuitry, or another data processing device for processing or manipulating data or executing software instructions stored, read, accessed or retrieved from the data storage device 46. For example, the electronic data processor 48 may execute or run the balancing module 28, the current estimator 30, or both. In one configuration, the balancing module 28 has or incorporates balancing algorithm and the current estimator 30 is associated with a State-of-Power current calculator. As used through the specification a module may refer to electronic hardware, software components, or both, where software components means software code, executable code, data files, libraries, logic, or the like.

The data storage device 46 may comprise one or more of the following: electronic memory, buffer memory, nonvolatile random access electronic memory, a magnetic storage device, an optical storage device, a hard-disk drive, or another mechanism for storing, retrieving, access, reading and writing data, files or other data structures in digital or analog format.

In FIG. 1, the electronic data processing system 29 receives, via one or more data ports 50 (e.g., data transceivers and buffer memory), sensor input data, such as sensed State-of-Charge, sensed voltage, sensed temperature, time in the charging mode or time in discharging mode, and sensed current for corresponding ones of the battery cells.

In one embodiment, the data processing system 29 is capable of communicating with a set of controllers 32, such as a first controller 44 and a second controller 42. The first controller 44 may comprise a controller, such as a proportional integral controller, for the charging mode. The second controller 42 may comprise a controller, such as a proportional integral controller for the discharging mode. The proportional integral (PI) controller refers to a controller that: (a) uses feedback control in which a signal proportional to the error is superimposed on a ramp obtained by integrating an output of the controller, and/or (b) has an output that is proportional to a linear combination of the input and the time integral of the input.

As illustrated in FIG. 1, the first controller 44 comprises a charging PI current controller 36 and a charging PI voltage controller 40; the second controller 42 comprises a discharging PI current controller 34 and a discharging PI voltage controller 38.

In an alternate embodiment, any PI controller may be replaced with a suitable proportional integral differential (PID) controller, a proportional differential (PD) controller, or another suitable controller. For example, for a PID controller the output is proportional to a linear combination of the input, the time integral of input and the time rate of change of the input.

The data processing system 29 provides a target charging current (e.g., subject to a charging current limit or range) and a target discharging current (e.g., subject to a discharging current limit or range) to the first controller 44 and the second controller 42, respectively. In turn, the first controller 44 provides a first duty cycle (e.g., commanded duty cycle) for a first DC-to-DC converter 20; the second controller 42 provides a second duty cycle (e.g., commanded duty cycle) for a second DC-to-DC converter 22. The current limit or range may be based on an average, mean, median, mode, lower limit, upper limit associated with one or more of the following: State of Power (SOP), State of Charge (SOC), Voltage-dependent SOP, SOC-dependent SOP, or the like, of one or more battery cells, where different values of SOP, SOC, Voltage-dependent SOP and SOC-dependent SOP may be used for the charging mode and discharging mode.

In one embodiment, the battery pack and balancing circuit 18 comprises a battery 14, a switch matrix interface 16, and one or more direct-current to direct-current converters 19, such as the first DC-to-DC converter 20 and the second DC-to-DC converter 22. The DC-DC converters 19 are coupled to switching matrix interface 16. In turn, the switch matrix interface 16 is coupled to a battery 14 (e.g., battery module).

A battery 14 has an array of battery cells. The battery 14 has a battery terminals of opposite DC polarity (e.g., positive and negative terminals). The battery cells have corresponding cellular terminals of opposite polarities (e.g., positive and negative terminals), where the cellular terminals of battery cells can be coupled together in a network, in series, in parallel or a combination of series and parallel networks. A battery 14 may be referred to synonymously as a battery pack because it is composed of an array or set of battery cells.

The switch matrix interface 16 may comprise semiconductor switches, such as transistors, diodes, relays or other electronic devices that can apply the target charging current to corresponding battery cells in the charging mode and that can apply target discharging current to the corresponding battery cells in the discharging mode.

In accordance with one embodiment and one aspect of the disclosure, a control system 11 for managing battery cells comprises a battery 14, which has an array of battery cells. The battery 14 has battery terminals and the battery cells have cellular terminals. An electronic data processor 48 is configured to execute software instructions of a cell balancing module 28 and current estimator 30, where the cell balancing module 28 and current estimator 30 are stored in a data storage device 46 in communication with the electronic data processor 48. A first direct-current to direct-current (DC-to-DC) converter 20 is configured to convert an input direct-current voltage to an output direct-current voltage with a regulated charging current consistent with a target charging current limit or range established by the current estimator 30 for the charging mode and respective cell identifier(s) determined by a cell balancing module 28 for the charging mode for the time interval. A first controller 44 is capable of controlling the charging, individually or collectively, of each of the battery cells by adjusting/controlling the regulated charging current outputted by the first DC-DC converter and/or the duty cycle of switches of the first DC-to-DC converter 20 based on the target charging current limit or range for the time interval.

In accordance with another aspect of the disclosure, a second direct-current to direct-current (DC-to-DC) converter 22 is configured to convert an input direct-current voltage to an output direct-current voltage with a regulated discharging current consistent with a target discharging current limit or range established by the current estimator 30 for the discharging mode and respective cell identifier(s) determined by a cell balancing module 28 for the discharging mode for the time interval. A second controller 42 is capable of controlling the discharging, individually or collectively, of each of the battery cells by adjusting/controlling the regulated discharging current outputted by the second DC-DC converter and/or the duty cycle of switches of second DC-to-DC converter 22 based on the target discharging current limit or range for the time interval.

In accordance with yet another aspect of the disclosure, a switch matrix interface 16 comprises a set of switches that is configured to enable or disable, selectively (for any time interval) by the electronic data processor 48: (a) a first electrical connection/coupling between DC output terminals of the first DC-to-DC converter 20 and one or more corresponding cellular terminals of battery cell(s), and (b) a second electrical connection/coupling between DC output terminals of the second DC-to-DC converter 22 and one or more corresponding cellular terminals of the battery cell(s), where each battery cell can operate in a mutually exclusive charging mode or discharging mode during any time interval.

Sensors 24 are associated with the battery 14, or a respective sensor 24 is associated with each cell of the battery 14. Each sensor 24 may comprise a voltage sensor and a current sensor to provide sensed voltages and sensed currents for corresponding battery cells for any time interval, to the electronic data processor 48 and the balancing module 28, the current estimator 30, or both. The balancing module 28 or the current estimator 30, or both, are configured to determine whether each battery cell operates in the charging mode or discharging mode for any time interval based on the sensed voltages and sensed currents for corresponding battery cells of the battery 14 (e.g., in accordance with State-of-Power evaluation of equations as described in this disclosure later in greater detail). The balancing module 28 is configured to provide control signals to enable or disable the switching states of the switches within the switching matrix interface 16 to establish the first electrical connection or the second electrical connection for each battery cell (e.g., to facilitate efficiency management of the battery 14 and balancing of the battery cells).

The electronic data processor 48, the balancing module 28 or the current estimator 30 is configured to determine a State of Charge (SOC) of the battery 14 or any battery cell with the battery 14. Similarly, the electronic data processor 48, the balancing module 28 or the current estimator 30 is configured to determine a State of Power (SOP) of the battery 14 or any battery cell with the battery 14. The SOC and SOP are further defined and described in the attached Appendix.

As illustrated in FIG. 1, a load 12 is switchably coupled to battery terminals of the battery 14 during an operational mode or load 12*ed* mode of the battery 14 in which the battery 14 provides energy to a load 12 coupled to the battery 14. Further, the charging mode or discharging mode of the first and second DC-to-DC converters (20, 22, 19) can overlap with or can be conducted simultaneously with the operational mode or load 12*ed* mode of the entire battery 14.

The entire battery charging mode applies electrical energy or the charging current to all battery cells, whereas the balancing charging mode applies electrical energy or the charging current to one or more selected cells in the charging mode. A charger 10 that is switchably coupled to battery terminals of the battery 14 during a (entire battery) charging mode of the battery 14 in which the charger 10 provides electrical energy (DC voltage) to the battery 14 via the battery terminals, wherein the (balancing) charging mode or discharging mode of the first and second DC-to-DC converters (20, 22, 19) can overlaps with or is conducted simultaneously with the charging mode of the entire battery 14. Further, the (balancing) charging and discharging of battery cells for balancing of the battery cells can occur simultaneously in a loaded mode, (entire battery) charging mode, or both of the entire battery 14.

The first controller 44 and the second controller 42 facilitate applying a proper charging current or discharging current to balance and manage efficiently the battery cells in accordance with various techniques that may be applied separately or cumulatively. In accordance with a first technique of battery management, the first controller 44 outputs a duty cycle command to the first DC-to-DC converter 20 that is based on the number of cells in the charging mode and the current limit associated with each battery cell in the charging mode, where in the duty cycle command is a value between 0 and 1, or as a corresponding percentage of a maximum pulse width (or pulse duration) of one or more switches (e.g., low-side switch, a high-side switch, or both) of the first DC-to-DC converter 20 that is pulse-width modulated.

Under a second technique of battery management, the second controller 42 outputs a duty cycle command to the second DC-to-DC converter 22 that is based on the number of cells in the discharging mode and the current limit associated with each battery cell in the discharging mode, where in the duty cycle command is a value between 0 and 1, or as a corresponding percentage of a maximum pulse width (or pulse duration) of one or more switches (e.g., a low-side switch or high-side switch) of the second DC-to-DC converter 22 that is pulse-width modulated.

In accordance with a third technique of battery management, the electronic data processor 48 or the first controller 44 is configured to determine the target charging current limit that has a lower target charging current limit and an upper target charging current limit for one or more battery cells in the charging mode based on corresponding state of charge (SOC) and corresponding state of power (SOP) for the respective battery cells in the charging mode for any time interval.

In accordance with a fourth technique of battery management, the electronic data processor 48 or the first controller 44 is configured to determine the target discharging current limit that has a lower target discharging current limit and an upper target discharging current limit for one or more battery cells in the discharging mode based on corresponding state of charge (SOC) and corresponding state of power (SOP) for the respective battery cells in the discharging mode for any time interval.

In accordance with a fifth technique of battery management, the electronic data processor 48 or the first controller 44 is configured to determine/select the target charging current limit, between the Voltage-dependent, State-of-Power maximum current ($I_{ChargeMaxSOPV}$) and the State-of-Charge-dependent State-of-Power maximum current ($I_{ChargeMaxSOPSOC}$), that has a lower target charging current limit in the charging mode determined in accordance with the following equations:

$$I_{ChargeMaxSOPV} = \frac{VOC - V_{max}}{R_{Series}}$$

$$I_{ChargeMaxSOPSOC} = \frac{SOC - SOC_{max}}{(t_{Charge})(\text{Capacity})(3600)}$$

where VOC is an open-circuit voltage for a corresponding battery cell; $V_{max}$ is the maximum DC voltage for charging a corresponding battery cell, and $R_{Series}$ is the series resistance or modeled series resistance of the corresponding battery cell; where SOC is the state of charge for a corresponding battery cell, $SOC_{max}$ is the maximum state of charge for a corresponding battery cell, $t_{charge}$ is the duration of the charging time (e.g., in units of seconds) in the charging mode for a corresponding battery cell, and the capacity is the capacity of the battery cell (e.g., expressed in Amp*Hour units).

In accordance with a sixth technique of battery management, the electronic data processor 48 or the second controller 42 is configured to determine/select the target discharging current limit, between the Voltage-dependent, State-of-Power maximum current ($I_{DischargeMaxSOPV}$) and the State-of-Charge-dependent State-of-Power maximum current ($I_{DiscargeMaxSOPSOC}$), that has a lower target charging current limit for one or more battery cells in the discharging mode in accordance with the following equations:

$$I_{DischargeMaxSOPV} = \frac{VOC - V_{min}}{R_{Series}}$$

$$I_{DischargeMaxSOPSOC} = \frac{SOC - SOC_{min}}{(t_{Discharge})(\text{Capacity})(3600)}$$

where VOC is an open-circuit voltage for a corresponding battery cell; $V_{min}$ is the minimum DC voltage for discharging a corresponding battery cell, and $R_{Series}$ is the series resistance or modeled series resistance of the corresponding battery cell; where SOC is the state of charge for a corresponding battery cell, $SOC_{min}$ is the minimum state of charge for a corresponding battery cell, $t_{discharge}$ is the duration of the discharging time (e.g., in units of seconds) in the discharging mode for a corresponding battery cell, and the capacity is the capacity of the battery cell (e.g., expressed in Amp*Hour units).

The sensors 24 are configured to sense one or more corresponding battery cells. In some configurations, cellular sensors 24 may be dedicated or assigned to corresponding battery cells. In other configurations, switches or multiplexers allow one sensor to be shared among multiple different battery cells on polling basis or time-division multiplex basis.

Each of the sensors 24 may comprise: a temperature sensor, a charging time sensor, or a discharging time sensor, associated with the battery 14 or associated with one or more corresponding cells of the battery 14; a state-of-charge sensor for providing the state-of-charge of each corresponding battery cell.

In one embodiment, the current estimator 30 is configured to estimate a state of charge for each corresponding battery cell, a state of power for each corresponding battery cell or both, for any time interval.

To summarize certain aspects of the disclosure, an active battery management or active battery balancing system incorporates one or more DC-DC converters 19. Although FIG. 1 shows a first DC-to-DC converter 20 that is dedicated or assigned to charging mode and a second DC-to-DC converter 22 that is dedicated or assigned to a discharging mode, in certain embodiments the first and second DC-to-DC converters (20, 22, 19) can be replaced by a single DC-to-DC converter or multiple DC-to-DC converters 19 that can operate in the charging mode, the discharging mode or both modes at separate time intervals. Further, one or more DC-DC converters 19 can achieve optimal cell balancing current because the data processing system 29, the balancing module 28, or the estimator uses one or more of the following: (a) the associated evaluation, analysis and equations related to SOP, as described in this document and the accompanying Appendix, (b) application of the multi-factor battery cell selection algorithm (MFCSA), (c) determination/selection of a target charging current limit (e.g., a lower target charging current limit), between the Voltage-dependent, State-of-Power maximum current ($I_{ChargeMaxSOPV}$) and the State-of-Charge-dependent State-of-Power maximum current ($I_{ChargeMaxSOPSOC}$), and (d) determination/selection of the target discharging current limit (e.g., a lower target discharging current limit), between the Voltage-dependent, State-of-Power maximum current ($I_{DischargeMaxSOPV}$) and the State-of-Charge-dependent State-of-Power maximum current ($I_{DischargeMaxSOPSOC}$).

In one example, the battery management system 11 detects the need of cell balancing through the MFCSA algorithm, calculates the ideal balancing current for the identified cell through its SoP, and injects the balancing current through one or more DC-DC converters 19 controlled by a cascaded control loop. The battery management system 11 features one or more DC-DC converters 19 in an active balancing configuration. Further, the data processing system 29 can determine the optimal balancing current considering SoP and implemented through the cascaded control loop for balancing current and cell voltage (control strategy), along with the MFCSA algorithm (selection algorithm). Collectively, the foregoing elements are well-suited for efficient cell balancing and reliable (e.g., safe) operation. The runtime or capacity of the battery can be extended. Electrical energy that can be injected or extracted from the battery cells can be increased, which tends to increase the energy efficiency of the entire battery, relative to the application of conventional no balancing strategies and passive balancing strategies in other alternate battery management systems 11.

The data processing system 29 and the current estimator 30 is well suited to estimate cell SoP to calculate or determine the optimal balancing current for each cell for a (balancing) charging mode, a discharging mode, or both. The battery management system 11 of this disclosure may be regarded as an active balancing systems. However, the battery management system 11 of this disclosure is not constrained or limited to operate one or more DC-DC converters 19 under fixed or pre-calculated duty cycles to provide the balancing current(s). Additionally, the battery management system 11 of this disclosure can use cascaded control loops for balancing current and cell voltage and the MFSCA selection algorithm, which supports the fine-tuning associated with separate balancing current limits in the (balancing) charging mode and the discharging mode. Further, FIG. 1 illustrates a charging mode control loop and a discharging mode control mode loop, where even though separate balancing current limits are supported for the charging mode and the discharging modes, the loops are synchronized and coordinated (e.g., tightly coupled) by the electronic data processor 48 of the data processing system 29.

One of ordinary skill in the art may attempt to circumvent the claims or the disclosure by varying the data processing system or the balancing module. For example, if the balancing module uses the MFCSA algorithm, it can be replaced or substituted by simpler algorithms that only consider one variable, such as voltage, to identify which cell needs balancing, which may degrade performance.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A control system for managing battery cells for a series of successive time intervals, the control system comprising:

a battery including battery terminals and an array of battery cells, the array of battery cells including a plurality of battery cells, each battery cell of the plurality of battery cells including cellular terminals;

an electronic data processor configured to execute software instructions of a cell balancing module and a current estimator, wherein the cell balancing module and the current estimator are storable in a data storage device in communication with the electronic data processor;

wherein the current estimator is configured to estimate a target charging current limit or a range of target charging current for a charging mode and a target discharging current limit or a range of target discharging current for a discharging mode for each battery cell of the plurality of battery cells for a time interval;

a first direct-current to direct-current (DC-to-DC) converter configured to convert a first input direct-current voltage to a first output direct-current voltage with a regulated charging current, the first output direct-current voltage consistent with the target charging current limit or the range of target charging current for the charging mode estimated by the current estimator for the charging mode, and consistent with respective cell identifiers determined by the cell balancing module for the charging mode for the time interval;

a first controller configured to control the charging, individually or collectively, of each battery cell of the plurality of battery cells by adjusting at least one of the regulated charging current outputted by the first DC-to-DC converter or a duty cycle of switches of the first DC-to-DC converter based on the target charging current limit or the range of target charging current for the charging mode for the time interval;

a second direct-current to direct-current (DC-to-DC) converter configured to convert a second input direct-current voltage to a second output direct-current voltage with a regulated discharging current, the second output direct-current voltage consistent with the target discharging current limit or the range of target discharging current for the discharging mode estimated by the current estimator for the discharging mode, and consistent respective cell identifiers determined by the cell balancing module for the discharging mode for the time interval;

a second controller configured to control discharging, individually or collectively, of each battery cell of the plurality of battery cells by adjusting at least one of the regulated discharging current outputted by the second DC-to-DC converter or a duty cycle of switches of second DC-to-DC converter based on the target discharging current limit or the range of target discharging current the discharging mode for the time interval;

a switch matrix interface including a set of switches configured to enable or disable, selectively by the electronic data processor, a first electrical connection between DC output terminals of the first DC-to-DC converter and one or more cellular terminals of the battery cells, and the set of switches is further configured to enable or disable, selectively by the electronic data processor, a second electrical connection between DC output terminals of the second DC-to-DC converter and the one or more cellular terminals of the battery cells, wherein each battery cell of the battery cells is configured to operate in a mutually exclusive charging mode or discharging mode during any time interval; and a plurality of sensors associated with the battery, or each battery cell of the plurality of battery cells, the plurality of sensors including a voltage sensor and a current sensor configured to provide sensed voltages and sensed currents for corresponding battery cells, for any time interval, to at least one of the electronic data processor and the cell balancing module, or the current estimator;

wherein at least one of the cell balancing module or the current estimator is configured to cause the control system to determine whether each battery cell of the battery cells operates in the charging mode or the discharging mode for any time interval based on the sensed voltages and the sensed currents for the corresponding battery cells, the cell balancing module configured to provide control signals to enable or disable switching states of the switches within the switch matrix interface to establish the first electrical connection or the second electrical connection for each battery cell of the battery cells, wherein at least one of the electronic data processor, the cell balancing module, or the current estimator is configured to cause the control system to determine a state of power (SOP) of each battery cell of the plurality of battery cells, and determine whether to individually apply the regulated charging current or the regulated discharging current to at least one battery cell of the plurality of battery cells based on the SOP determined for the at least one battery cell of the plurality of battery cells, and wherein the electronic data processor or the first controller is configured to determine the target charging current limit that has a lower target charging current limit and an upper target charging current limit for one or more battery cells in the charging mode based on a state-of-charge (SOC) and the state of power (SOP) for the one or more battery cells in the charging mode for any time interval.

2. The control system of claim 1, wherein at least one of the electronic data processor, the cell balancing module, or the current estimator is configured to determine a State of Charge of the battery or any battery cell within the battery.

3. The control system of claim 1, further comprising:

a load that is switchably coupled to the battery terminals of the battery during an operational mode or a loaded mode of the battery in which the battery is configured to provide energy to a load coupled to the battery, wherein the charging mode or the discharging mode of the first DC-to-DC converter and the second DC-to-DC converter overlaps with or is conducted simultaneously with the operational mode or the loaded mode of the battery.

4. The control system of claim 1, further comprising:

a charger that is switchably coupled to the battery terminals of the battery during the charging mode of the battery in which the charger provides electrical energy (DC voltage) to the battery via the battery terminals, wherein the charging mode or the discharging mode of the first DC-to-DC converter and the second DC-to-DC converter overlaps with or is conducted simultaneously with the charging mode of the battery.

5. The control system of claim 1, wherein:

the first controller is configured to output a duty cycle command to the first DC-to-DC converter based on a number of cells in the charging mode and the target charging current limit associated with each battery cell of the plurality of battery cells in the charging mode, wherein the duty cycle command is a value between 0 and 1, or a percentage of a maximum pulse width (or pulse duration) of one or more switches of the first DC-to-DC converter that is pulse-width modulated, the one or more switches including at least one of a low-side switch or a high-side switch.

6. The control system of claim 1, wherein:

the second controller is configured to output a duty cycle command to the second DC-to-DC converter based on a number of cells in the discharging mode and the target discharging current limit associated with each battery cell of the plurality of battery cells in the discharging mode, wherein the duty cycle command is a value between 0 and 1, or a percentage of a maximum pulse width (or pulse duration) of one or more switches of the second DC-to-DC converter that is pulse-width modulated, the one or more switches including a low-side switch or a high-side switch.

7. The control system of claim 1, wherein the electronic data processor or the first controller is configured to determine the target discharging current limit that has a lower target discharging current limit and an upper target discharging current limit for one or more battery cells in the discharging mode based on a state of charge (SOC) and the state of power (SOP) for the one or more battery cells in the discharging mode for any time interval.

8. The control system of claim 1, wherein the electronic data processor or the first controller is configured to determine the target charging current limit, between a Voltage-dependent, a State-of-Power maximum current ($I_{ChargeMaxSOPV}$) and a State-of-Charge-dependent State-of-Power maximum current ($I_{ChargeMaxSOPSOC}$), that has a lower target charging current limit in the charging mode determined in accordance with:

$$I_{ChargeMaxSOPV} = \frac{VOC - V_{max}}{R_{Series}}$$

-continued $$I_{ChargeMaxSOPSOC} = \frac{SOC - SOC_{max}}{(t_{Charge})(\text{Capacity})(3600)}$$

wherein VOC is an open-circuit voltage for a corresponding battery cell; $V_{max}$ is a maximum DC voltage for charging the corresponding battery cell, and $R_{series}$ is a series resistance or modeled series resistance of the corresponding battery cell; where SOC is a state of charge for a corresponding battery cell, $SOC_{max}$ is a maximum state of charge for the corresponding battery cell, $t_{charge}$ is a duration of a charging time in the charging mode for the corresponding battery cell, and Capacity is a capacity of the corresponding battery cell, wherein the charging time is provided in units of second and the Capacity is provided in Amp*Hour units.

9. The control system of claim 1, wherein the electronic data processor or the second controller is configured to determine the target discharging current limit, between a Voltage-dependent, a State-of-Power maximum current ($I_{DischargeMaxSOPV}$) and a State-of-Charge-dependent State-of-Power maximum current ($I_{DischargeMaxSOPSOC}$), that has a lower target charging current limit for one or more battery cells in the discharging mode in accordance with:

$$I_{DischargeMaxSOPV} = \frac{VOC - V_{min}}{R_{Series}}$$

$$I_{DischargeMaxSOPSOC} = \frac{SOC - SOC_{min}}{(t_{Discharge})(\text{Capacity})(3600)}$$

where VOC is an open-circuit voltage for a corresponding battery cell; $V_{min}$ is a minimum DC voltage for discharging the corresponding battery cell, and $R_{series}$ is a series resistance or modeled series resistance of the corresponding battery cell; where SOC is a state of charge for the corresponding battery cell, $SOC_{min}$ is a minimum state of charge for the corresponding battery cell, $t_{discharge}$ is a duration of a discharging time in the discharging mode for the corresponding battery cell, and capacity is a capacity of the corresponding battery cell, wherein the discharging time is provided in units of second and the Capacity is provided in Amp*Hour units.

10. The control system of claim 1, wherein the plurality of sensors further includes a temperature sensor associated with the battery or associated with one or more battery cells of the battery.

11. The control system of claim 1, wherein the plurality of sensors further includes a state-of-charge sensor for providing the state-of-charge of each battery cell.

12. The control system of claim 1, wherein the current estimator is configured to estimate at least one of the state-of-charge for each battery cell or the state of power for each battery cell for any time interval.

* * * * *